(12) United States Patent
Ream et al.

(10) Patent No.: US 6,267,997 B1
(45) Date of Patent: Jul. 31, 2001

(54) METHOD FOR PRODUCING PRINTED CONFECTIONERY PRODUCTS

(75) Inventors: Ronald L. Ream, Plano; Christine L. Corriveau, Orland Park; S. Kristine Cahill, Sugar Grove; Donald C. Hassler, Naperville; Jeffery C. Mormann, Minooka; Nicholas Partipilo, Naperville; Rocco A. Pawlowski, Wheaton; Ralph R. Burin, Annandale, all of IL (US); E. Michael Ackley, Jr.; Samuel J. Louden, both of Mooretown, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/070,985

(22) Filed: May 1, 1998

Related U.S. Application Data

(63) Continuation of application No. PCT/US96/17461, filed on Oct. 28, 1996, which is a continuation-in-part of application No. 08/548,293, filed on Nov. 1, 1995, now abandoned.

(51) Int. Cl.[7] .............................. A23G 3/00; A23G 3/28; A23G 3/30
(52) U.S. Cl. .................. 426/3; 426/5; 426/383; 426/660
(58) Field of Search .............................. 426/3, 5, 76, 383, 426/660

(56) References Cited

U.S. PATENT DOCUMENTS

| | | |
|---|---|---|
| 2,102,808 | 12/1937 | Piperoux . |
| 2,682,253 | 6/1954 | Scherer et al. . |
| 2,785,786 | 3/1957 | Bartlett . |
| 2,825,278 | 3/1958 | Schwisow . |
| 2,929,320 | 3/1960 | Hansen et al. . |
| 3,052,552 * | 9/1962 | Koerner et al. ............................ 426/3 |
| 3,215,536 * | 11/1965 | Simeone et al. .......................... 426/3 |
| 3,570,417 * | 3/1971 | Herrmann et al. . |
| 3,601,041 | 8/1971 | Perra, Jr. et al. ...................... 101/37 |
| 3,868,902 | 3/1975 | Bradshaw et al. ..................... 101/44 |
| 3,884,143 * | 5/1975 | Ackley ................... 101/37 |
| 4,308,942 | 1/1982 | Ackley ................... 198/380 |
| 4,397,871 * | 8/1983 | Meyer et al. .............................. 426/5 |
| 4,479,429 | 10/1984 | Haryu ................................. 101/38 A |
| 4,528,904 * | 7/1985 | Ackley ................... 101/35 |
| 4,672,892 | 6/1987 | Ackley ................... 101/35 |
| 4,855,146 * | 8/1989 | Murakami et al. ...................... 426/5 |
| 4,905,589 * | 3/1990 | Ackley ................... 101/35 |
| 5,376,388 * | 12/1994 | Meyers ...................... 426/5 |
| 5,433,146 | 7/1995 | Ackley ................... 101/35 |
| 5,534,281 * | 7/1996 | Pappas et al. ....................... 426/383 |
| 5,655,453 | 8/1997 | Ackley ................... 101/483 |
| 5,768,996 | 6/1998 | Ackley ................... 101/483 |
| 5,800,601 | 9/1998 | Zou et al. ......................... 106/31.65 |
| 5,878,658 | 3/1999 | Ackley ................... 101/35 |

FOREIGN PATENT DOCUMENTS

| | | |
|---|---|---|
| 0 734 655 A1 | 10/1996 | (EP) . |
| 0 739 957 A1 | 10/1996 | (EP) . |
| 0 919 377 A1 | 10/1996 | (EP) . |
| 22140 | 6/1912 | (GB) . |
| 21221 | 9/1914 | (GB) . |
| 1007705 | 10/1965 | (GB) . |
| 1119302 | 7/1968 | (GB) . |
| 2186782 | 8/1987 | (GB) . |

(List continued on next page.)

*Primary Examiner*—Arthur L. Corbin
(74) *Attorney, Agent, or Firm*—Steven P. Shurtz; Brinks Hofer Gilson & Lione

(57) ABSTRACT

A method and apparatus are provided for printing indicia on confectionery products such as chewing gum. A mass of confectionery product is formed into a thin, flat sheet. The sheet may be divided into individual sheets for cooling. Next, the sheet or sheets of confectionery are passed through the printing machine to print indicia thereon. Printed confectionery products and packages thereof are also provided.

53 Claims, 7 Drawing Sheets

FOREIGN PATENT DOCUMENTS

| | | |
|---|---|---|
| 2230686 | 10/1990 | (GB) . |
| 48-103787 | 12/1973 | (JP) . |
| 49-52009 | 5/1974 | (JP) . |
| 49-73223 | 7/1974 | (JP) . |
| 49-80219 | 8/1974 | (JP) . |
| 49-46848 | 12/1974 | (JP) . |
| 50-76905 | 7/1975 | (JP) . |
| 54-70417 | 6/1979 | (JP) . |
| 55-23955 | 2/1980 | (JP) . |
| 55-164164 | 12/1980 | (JP) . |
| 56-82255 | 7/1981 | (JP) . |
| 57-88850 | 4/1982 | (JP) . |
| 57-100071 | 6/1982 | (JP) . |
| 58-5285 | 1/1983 | (JP) . |
| 59-145184 | 9/1984 | (JP) . |
| 60-5250 | 2/1985 | (JP) . |
| 60-192537 | 10/1985 | (JP) . |
| 60-182143 | 12/1985 | (JP) . |
| 61-279556 | 12/1986 | (JP) . |
| 62-138279 * | 6/1987 | (JP) .................................. 426/383 |
| 62-119232 | 7/1987 | (JP) . |
| 63-198533 | 12/1988 | (JP) . |
| 64-16678 | 1/1989 | (JP) . |
| 2-122975 | 5/1990 | (JP) . |
| 2-220881 | 9/1990 | (JP) . |
| 2-239972 | 9/1990 | (JP) . |
| 3-162988 | 7/1991 | (JP) . |
| 4-8227 | 2/1992 | (JP) . |
| 6-40007 | 2/1994 | (JP) . |
| 7-17018 | 1/1995 | (JP) . |
| 7-81050 | 3/1995 | (JP) . |
| 8-176 | 1/1996 | (JP) . |
| 8-300620 | 11/1996 | (JP) . |
| 9-39366 | 2/1997 | (JP) . |
| 10-129104 | 5/1998 | (JP) . |
| WO81/01232 * | 5/1981 | (WO) .................................. 426/3 |
| WO 88/05725 | 8/1988 | (WO) . |
| WO 88/08254 | 11/1988 | (WO) . |
| WO97/16075 * | 5/1997 | (WO) . |
| WO 97/27759 | 8/1997 | (WO) . |

\* cited by examiner

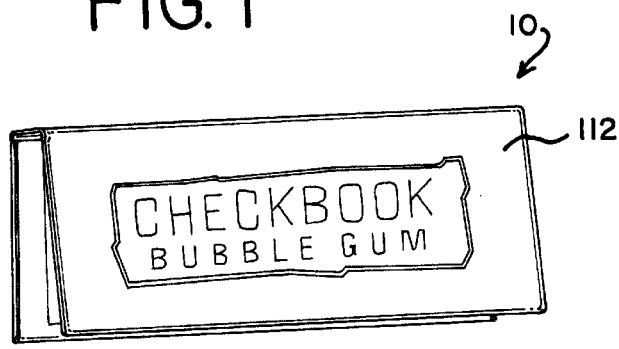
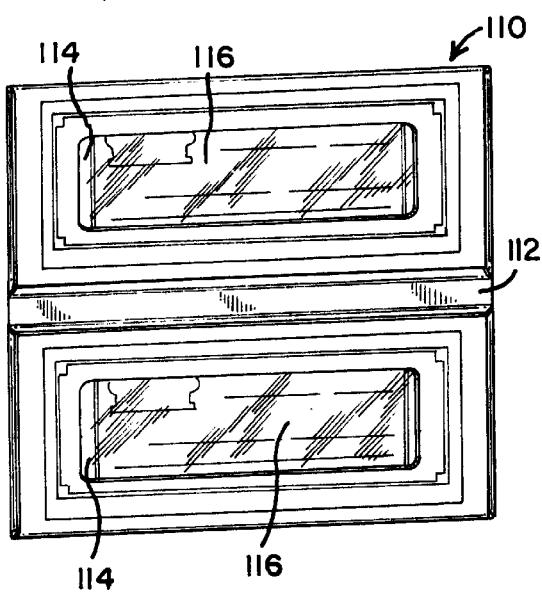
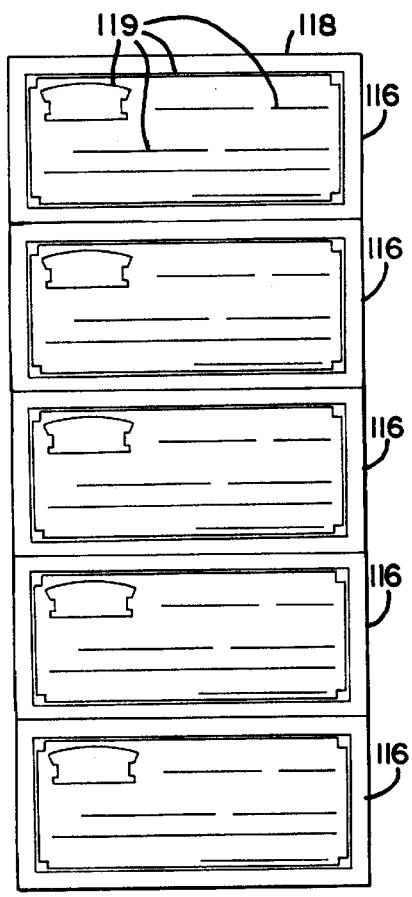

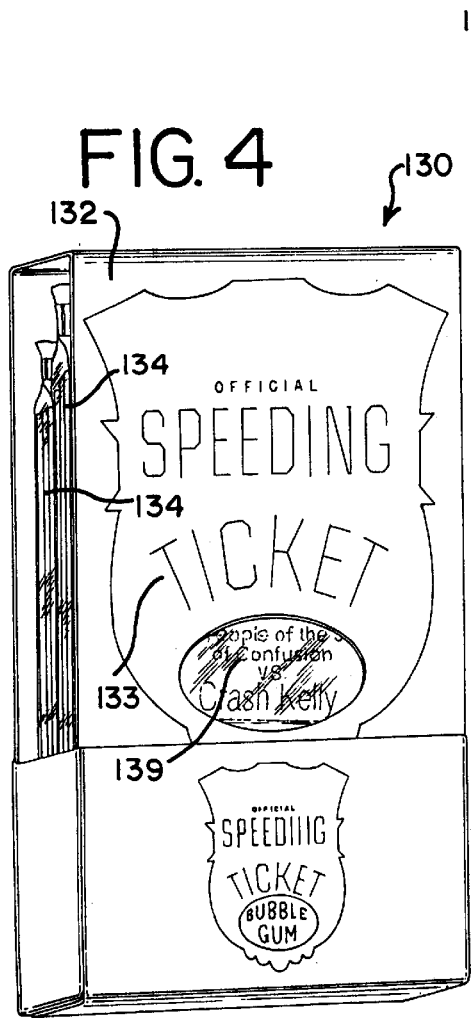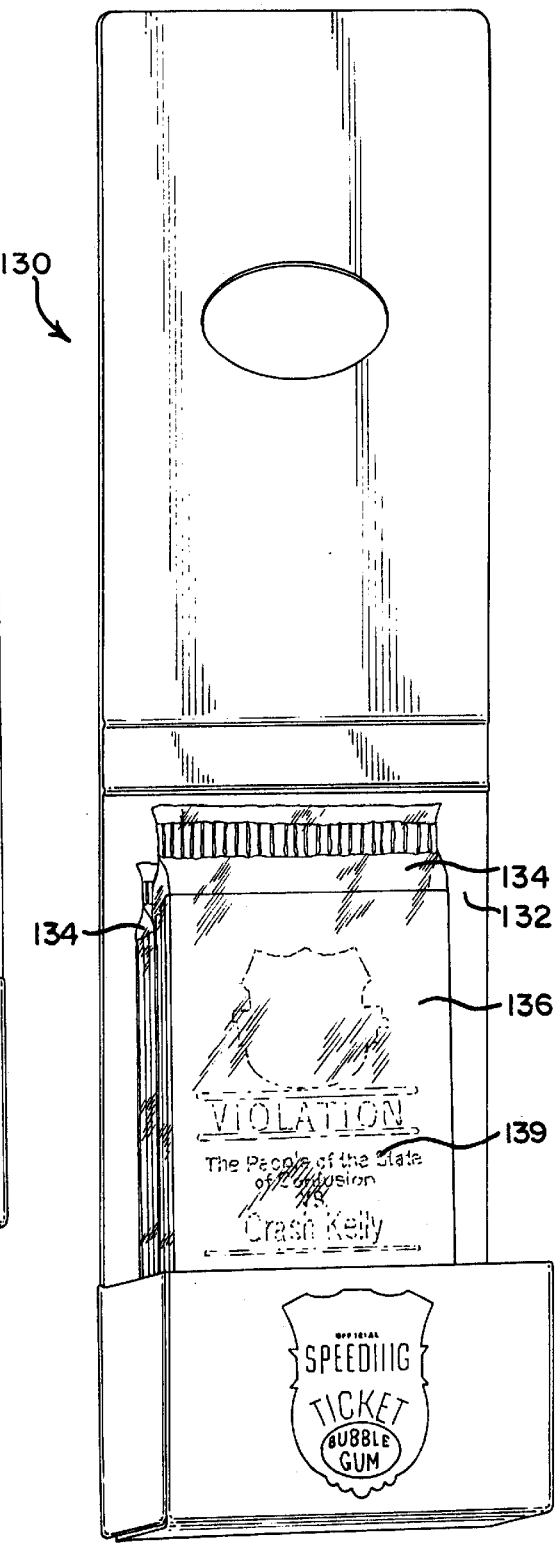

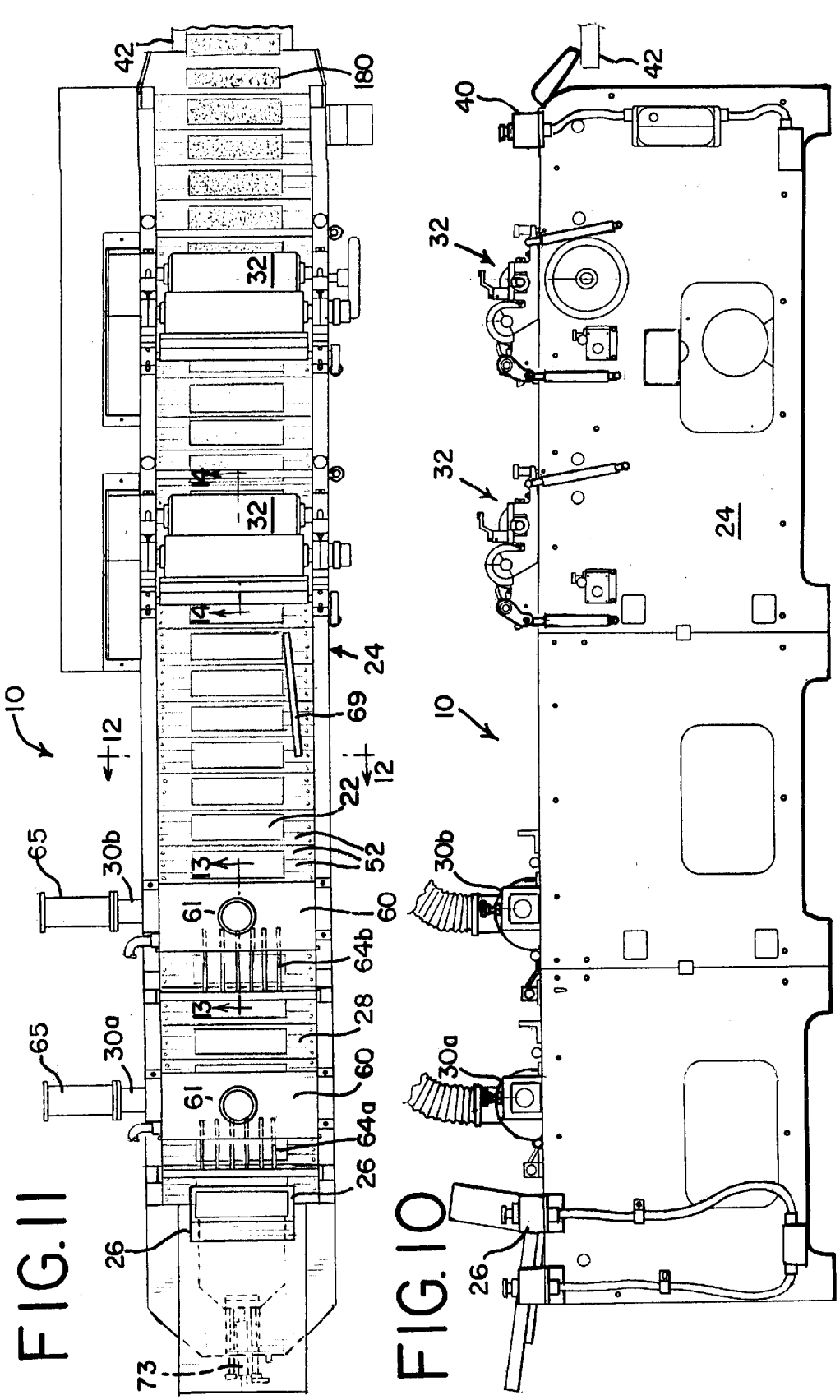

METHOD FOR PRODUCING PRINTED CONFECTIONERY PRODUCTS

CROSS REFERENCE TO RELATED APPLICATIONS

The present application is a continuation of PCT Application Ser. No. PCT/US96/17461 filed Oct. 28, 1996 designating the United States, now abandoned, which is a continuation-in-part of application Ser. No. 08/548,293, filed Nov. 1, 1995, now abandoned, both of which are hereby incorporated by reference.

BACKGROUND OF THE INVENTION

The present invention relates generally to the field of confectionery products. More specifically, the present invention relates to printing indicia on confectionery, including chewing gum.

To promote its marketability, confectionery products have been molded, extruded and otherwise shaped into various forms over the years. For example, bubble gum has been formed into shapes such as flat sheets, cylinders, cubes, cigars, shredded chew, and the like. Providing a confectionery product, such as bubble gum, in novel shapes or forms enhances the marketability of such a product, particularly with younger customers.

Likewise, providing bubble gum in unique containers and packages enhances the marketability of the bubble gum product. In fact, bubble gum products and containers designed for children now comprise a substantial portion of the gum industry. Naturally, the more fun and exciting the packaging is for the bubble gum or other confectionery, the more a younger customer will want such products.

One unique aspect that has previously not been explored is the printing of indicia directly on chewing gum or other confectionery products, particularly to make the products simulate a known article.

Small, hard articles, such as pharmaceutical capsules, tablets and candies, often are marked with indicia, such as trademarks, lot numbers and the like. U.S. Pat. No. 4,528,904 details a printing apparatus for such purposes, as well as various printing machines that have been utilized in the past to print indicia on such small, hard articles. U.S. Pat. No. 4,905,589 discloses an apparatus for ink-jet marking of pellet-shaped articles.

U.S. Pat. No. 3,052,552 discloses a process of printing on the surface of confection items such as chewing gum using relief, offset and gravure printing methods. However, the patent does not specify whether any indicia, or simply stripes or other continuous areas, can be printed on the gum, although one of the purposes of the invention is stated to be printing at high speeds without smudging.

U.S. Pat. No. 3,215,536 discloses an improved ink for printing on chewing gum, and states that "It has been proposed that various printing designs, such as numerals, letters, words, phrases, and the like be imprinted on the surface of the slab gum sticks." This patent discloses the use of a conventional Harley Proving Press machine, but again does not disclose the actual printing of any specific indicia. Further, no commercial products made by such a process are commercially available today. It may be that these prior proposals were never commercially successful because the printing operation added a high cost to the product, did not have a good print quality, or both.

Thus it is believed that no commercial printing of any indicia onto chewing gum was accomplished heretofore, particularly with any high degree of resolution, which is difficult but which would make for a more desirable product. Further, there is no disclosure of printing on confectionery products with more than one color of ink, with the multiple colors of printing in register with one another, which would provide even a more desirable product.

Therefore, a need exists for a method and apparatus for printing indicia on chewing gum or other confectionery products, particularly at high resolution, at a high speed, and in a cost efficient manner.

SUMMARY OF THE INVENTION

The present invention provides a method and apparatus for printing indicia on chewing gum and other confectionery products. The preferred method includes the following steps. Initially, a sheet of chewing gum is provided. The sheet is preferably cooled to allow for hardening or tempering of the chewing gum. Preferably the sheet is divided into individual sheets that are cooled so that the sheets can be fed to a printing operation by an indexed printer. Then the chewing gum is passed through a suitable printing press to print indicia on the sheet of chewing gum. In a preferred embodiment, the sheet is formed on a machine separate from that used for printing on the sheets.

The present invention also provides an apparatus for printing indicia on soft confectionery products such as chewing gum. In an embodiment, the apparatus includes means for delivering gum sheets to the printing operation which prints indicia on the sheets of chewing gum.

Moreover, the present invention provides a printed product comprising a chewing gum piece or other confectionery product with indicia printed thereon. Pursuant to the present invention, the indicia can be in many forms and colors. The indicia printed on the chewing gum pieces or other confectionery pieces comprises an edible ink.

In an embodiment, the confectionery product incorporates at least two different colors of indicia that are printed on pieces of confectionery. Preferably the multiple colors are in registration with one another.

In an embodiment, the confectionery is a chewing gum product, such as bubble gum pieces. The bubble gum may be printed to look like a check (bank draft), and preferably packaged to simulate a checkbook. Other embodiments include traffic citations, sports trading cards and even a "magic eye" puzzle printed on chewing gum.

The present invention offers a practical means for printing indicia on confectionery products such as chewing gum and provides a printed product, preferably with a high degree of resolution. The preferred embodiment, with printed chewing gum pieces that simulate known printed articles, are fun to look at and chew. Packaging which simulates a holder for the known articles adds to the play value of the products.

Additional features and advantages of the present invention are described in, and will be apparent from, the detailed description of the presently preferred embodiments, as well as the drawings.

BRIEF DESCRIPTION OF THE DRAWINGS

FIG. 1 is a perspective view of a first embodiment of a printed confectionery product package simulating a checkbook.

FIG. 2 is a plan view of the checkbook of FIG. 1 in an open configuration, showing confectionery with printed indicia thereon.

FIG. 3 is a plan view of a slab of confectionery prior to slicing with printing thereon in the form of five checks.

FIG. 4 is a perspective view of a second embodiment of a printed confectionery product package simulating a police officer's book of traffic citations.

FIG. 5 is a perspective view of the package of FIG. 4 with the flap open.

FIG. 10 is a side view of an embodiment of a printing apparatus of the present invention.

FIG. 11 is a top plan view of the printing apparatus of FIG. 10.

DETAILED DESCRIPTION OF THE DRAWINGS AND PRESENTLY PREFERRED EMBODIMENTS

Figure 6:
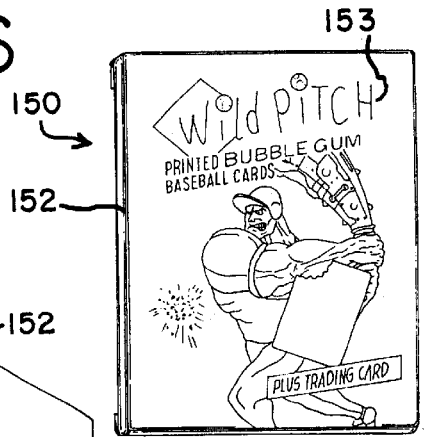
FIG. 6 is a perspective view of a third embodiment of a printed confectionery product package simulating a packet of sports trading cards.

The present invention provides methods and apparatus for printing indicia on chewing gum and other confectionery products, and the resulting printed products. As used herein, the term chewing gum is broadly used and refers to all types of chewing gum, such as bubble gum and the like. Other confectionery products with which the invention may be utilized include taffy, gummy candy, dehydrated fruit based confections and the like. While methods and apparatuses may have existed for printing tablets, capsules and the like, the industry has never developed a commercially acceptable method or apparatus for printing indicia on soft confectionery products, particularly sheet chewing gum, that operated at high speed, had good print quality and was cost effective.

FIGS. 1–8 depict four different products utilizing printed indicia on confectionery products, in this case chewing gum. For each product, there is a package containing one or more generally flat, rectangular chewing gum pieces, each having an edible ink on the gum piece in the form of a printed indicia simulating a known printed object. Further, the outer package includes a reference to the object simulated by the chewing gum having printed indicia thereon. Of course, instead of chewing gum, other confectionery products could be used.

FIGS. 1 and 2 show a product 110 referred to as "Check Book Bubble Gum". The product includes an outer package 112 simulating a checkbook, which opens up as shown in FIG. 2. Inside the checkbook 112 are multiple pieces of chewing gum 116. Each piece 116 is generally flat and rectangular. Several pieces 116 are wrapped together in one protective plastic pouch 114. Two pouches 114 are included, one in each pocket of the checkbook 112.

The pieces of chewing gum 116 are preferably made by dividing a sheet of chewing gum 118 (FIG. 3) into the individual pieces, each with an individual printed indicia thereon. In the embodiment shown in FIG. 3, five checks (bank drafts) are printed on one sheet 118, and then the sheet is divided between the checks to give five individual pieces of chewing gum 116. In this way the printing operation is simplified since five pieces of chewing gum are printed at one time. Also, it is easier to print on the larger sheet 118 than it would be to print on the individual pieces 116.

Preferably each of the pieces 116 making up sheet 118 and in the package 112 has a different indicia of a similar object printed thereon. Thus one package contains multiple pieces of chewing gum, but each piece is different. For example, in the "Check Book Bubble Gum", each piece of gum 116 has indicia 119 printed thereon representing several items found on a typical bank draft, such as a date, a check number, the payee (entity to whom the check is made out), a dollar amount (in numerical and written form) and a signature, as well as other symbols and a border. Preferably the indicia represents fictional information that is clever and relates to the type of printed article being simulated. For example, the check number on gum pieces 116 simulating a check could be "I8it", "UChu" or "UR2CUTE"; the date could be "Justintime 1, 1999"; or "Feb. 30, 1999"; the payee could be "M. Bezzler"; "M. T. Vault" or "Bo Gus Bucks"; the dollar amount could be "$1,000,000,000,000,000.00 One Zillion Dollars and 00/100"; the signature could be "Wally Street"; "Kool Cash" or "Granny Larceny".

FIGS. 4 and 5 depict another product 130 using the present invention, referred to as "Speeding Ticket Bubble Gum". Product 130 also includes an outer package 132 which includes a reference 133 to the object simulated by the printed chewing gum, in this case a police officer's booklet of traffic citations. The package 132 opens up as shown in FIG. 5 and contains two plastic protective pouches 134 each including several pieces of chewing gum 136. Each piece of chewing gum 136 has indicia 139 printed thereon simulating the printing on a traffic citation. Preferably each piece 136 will have different printing thereon, again representing fictional information cleverly related to the simulated traffic ticket. For example, in addition to an official looking seal and the words "VIOLATION"; "The People of the State of Confusion vs." and "Speedy Smith" or "Crash Kelly", the indicia may have boxes, one of which is checked, with a pretended violation thereafter, such as "Breaking the Sound Barrier"; "Reckless Driving"; "Otherwise Traveling 'Way Too Fast'"; "Impersonating a Crash Test Dummy"; "No Helmet" or "Look Mom . . . 'NO HANDS'". Also, an amount of a fine and the fictional name of a police officer, such as "Lieutenant Lawful" or "Officer Friendly" can be included. As with chewing gum pieces 116, gum pieces 136 may be divided from a larger sheet that includes several different traffic citation types of printed indicia 139.

Figure 7:
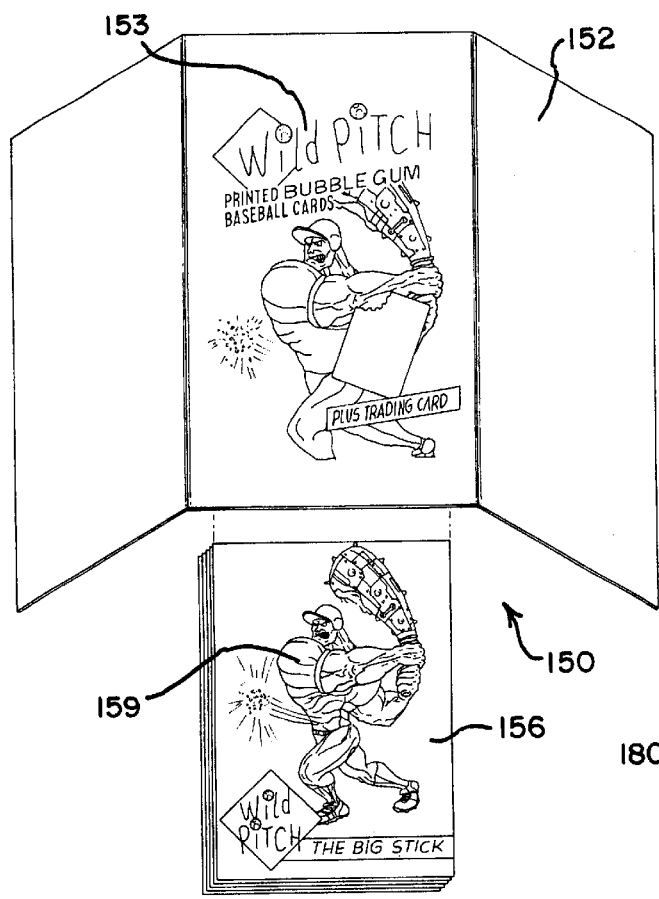
FIG. 7 is a view of the package of FIG. 6 with the package open.

FIGS. 6 and 7 depict a product 150 constituting another embodiment of the invention, referred to as "Wild Pitch Printed Bubble Gum Baseball Cards". As with the other embodiments, the printed chewing gum pieces 156 are packaged in an outer package 152 which includes a reference 153 to the object simulated by the printed chewing gum, which in the case of product 150 is a sports trading card, particularly a baseball trading card. Several pieces of chewing gum 156, preferably each with a different indicia 159 printed thereon, are included in the package 152. Optionally a non-chewing gum trading card can also be included in package 152.

Figure 8:
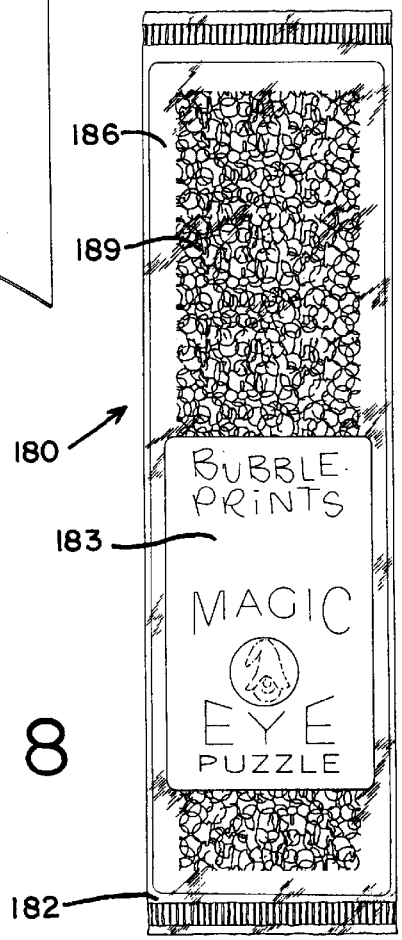
FIG. 8 is a plan view of a fourth embodiment of a printed confectionery product and package.

FIG. 8 shows a fourth embodiment of the invention, product 180 referred to as "Bubble-Prints Magic Eye™ Puzzle". In the case of product 180 the outer package 182 is a plastic wrapper with a reference 183 printed thereon referring to the Magic Eye™ Puzzle simulated by the printed chewing gum 186. In this embodiment, two colors of opaque ink are used to print the indicia 189. Magic Eye™ is a trademark of N.E. Thing Enterprises. Magic Eye™ puzzles have recently become quite popular, and are often reproduced in books or on posters. As used herein, the term "magic eye puzzle" refers to a printed image which, when a person's eyes are focused on the proper plane, which is different than the plane on which the image is printed, creates a three dimensional image in the mind of the person looking at the puzzle. In the preferred embodiment, using two or more colors of edible ink in proper registration, the indicia 189 on the chewing gum piece 186 constitute a magic eye puzzle.

Figure 9:
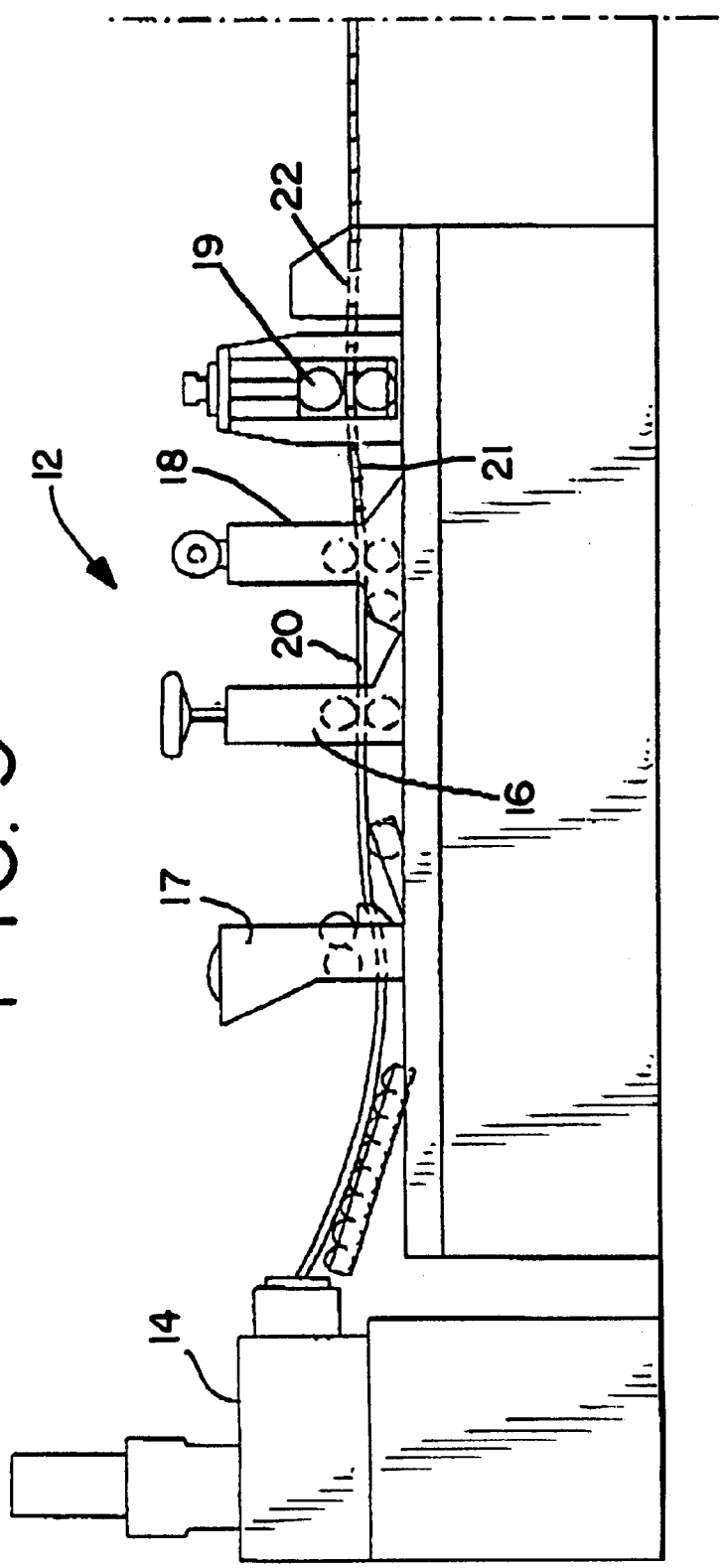
FIG. 9 is a side view of a conventional apparatus for creating sheets of chewing gum.

Referring now to the drawings of the apparatus, FIG. 9 illustrates generally a process for sheeting chewing gum. In this regard, an apparatus 12 is provided for forming a flat rectangular sheet of a chewing gum. FIGS. 10–16 illustrate the apparatus 10 of the present invention for printing indicia on the gum. It should be noted that the sheeting step can be performed in a separate operation or facility from the printing step.

In an embodiment, the means 12 for forming a flat rectangular sheet is a conventional chewing gum rolling machine. For example, a suitable rolling machine 12 that may be utilized in the present invention can be purchased from the Gimpel Manufacturing Company, W.L.S. of West Germany. Naturally, other machines with the ability to roll or extrude a sheet of chewing gum can also be used.

The conventional rolling machine 12 includes an extruder 14 into which a mass of the chewing gum is put. A series of rollers 16 act on the mass of chewing gum to form a relatively thin, flat continuous sheet 20. The rolling machine 12 also includes a dusting apparatus 17 for dusting the sheet 20 in order to reduce any adhesiveness. Typically, starch may be utilized as the dusting compound. However, in order to improve the print quality of the resulting printed gum product, only a minimal amount of starch or dusting compound should be utilized.

The rollers 16 size the thin, flat sheet 20 to a few thousandths of an inch larger than the desired configuration size. In an embodiment, the rollers 16 size the thin, flat sheet to a thickness ranging from approximately 0.054 inches to about 1.00 inches. In an embodiment, the resulting flat sheet has a thickness of approximately 0.058 inches to about 0.062 inches, with an ideal thickness of 0.060 inches. Sizing the thin, flat sheet 20 to the desired thickness allows for the subsequent printing of such sheets.

After the rolling machine 12 forms the chewing gum into a thin, flat sheet 20, the sheet 20 could be printed on in a continuous fashion, but more preferably it is cut across its width by a rotating blade 18 to form individual sheets 21. These sheets are then scored by a set of rotating knives 19 into smaller sheets 22. The sheets 22 which are actually printed on will preferably be about five to about 20 inches wide, more preferably about eight to about 14 inches wide, and most preferably about 10 inches wide. The sheets will preferably be about one inch to about 17 inches long, more preferably about two to about seven inches long, and most preferably about 4½ inches long. As used above, the term "length" refers to the dimension in the direction of travel through the printing operation, and the term "width" is the dimension perpendicular thereto. Of course, after the printing operation the sheets 22 may be further divided. The terms "length" and "width" when describing dimensions of sheets or pieces of chewing gum may therefore use the conventional terminology where "length" refers to the longest side, regardless of its orientation with respect to the direction of travel of the gum sheet or piece.

In an embodiment, gum scores are made at approximately 4¼ inch intervals across a 17 inch wide and 10 inch long sheet, producing a sheet 22 which is 10 inches by 4½ inches. In another embodiment, the sheets 22 are about 10 inches by 2⅞ inches. Thereafter, the sheets of chewing gum are stacked, stored and cooled to a sufficient temperature and for a sufficient time to allow for tempering/hardening of the chewing gum for automatic feeding of the gum sheets to the printing operation, as well as for the printing operation itself.

Any type of cooling tunnel or cooling device that effectively cools the sheets 22 of chewing gum to a temperature of approximately 48° F. to 70° F. can be utilized in the present invention. In an embodiment, the sheets 22 of chewing gum are cooled to a temperature ranging from approximately 48° F. to 56° F. In a preferred embodiment, the chewing gum is cooled to approximately 51° F. to about 55° F. prior to printing.

The ideal temperature for the sheets 22 depends upon the formulation of the chewing gum. Naturally, the formulation of the chewing gum affects the tackiness and ultimate printing of such gum. If the gum were to be printed on as one continuous sheet, adequate cooling would be carried out between the sheet forming equipment and the printing operation. If the gum is cut into individual sheets 22, the chewing gum is preferably cooled and stored for a period of time prior to printing indicia on such gum. In an embodiment, the chewing gum is stored for a time of approximately 12 hours to about 36 hours. In an embodiment, the chewing gum is stored for approximately 18 to 30 hours, with the most ideal time being 24 hours.

In a preferred embodiment, the gum that is to be printed is bubble gum. Notably, the specific formulation of the bubble gum is not critical to the performance of the present invention. In general, the bubble gum formulation should be of sufficient texture so as to promote printing of indicia on same. Also, the formulation for the bubble gum, including the amount and type of dusting compound, should be selected so as to avoid adhesion of the bubble gum to itself.

An example of a preferred bubble gum formulation is as follows:

| Ingredients | Percent (by wt.) |
|---|---|
| Powdered Sugar | 65.69 |
| Gum Base | 20.79 |
| Corn Syrup | 8.79 |
| Glycerine | 3.23 |
| Lecithin | 0.71 |
| Flavoring | 0.75 |
| Color In Dispersing Agent | 0.04 |

After the cooling and storing steps, the sheets 22 of gum then have indicia printed thereon. FIGS. 10–16 illustrate the means for printing indicia, namely printing machine 24 of the apparatus 10. As one skilled in the art would recognize, a variety of printing machines could be modified, pursuant to the concepts described herein, to perform the printing of indicia on the chewing gum. Thus, while the present description will reference an example of a suitable printing machine 24, the inventors intend such other embodiments to fall within the scope of the present invention.

Referring now to FIGS. 10 and 11, the printing machine 24 includes a magazine feeder 26 for use when individual sheets 22 are printed on. The magazine feeder 26 feeds the chewing gum sheets 22 into the printing machine 24. In an embodiment, the magazine feeder 26 is a bottom discharge magazine slab feeder for feeding the gum. The sheets 22 of gum can be manually loaded on the magazine feeder 26. In a preferred embodiment, the magazine feeder 26 is capable of stacking gum up to 12 inches high.

Figure 16:
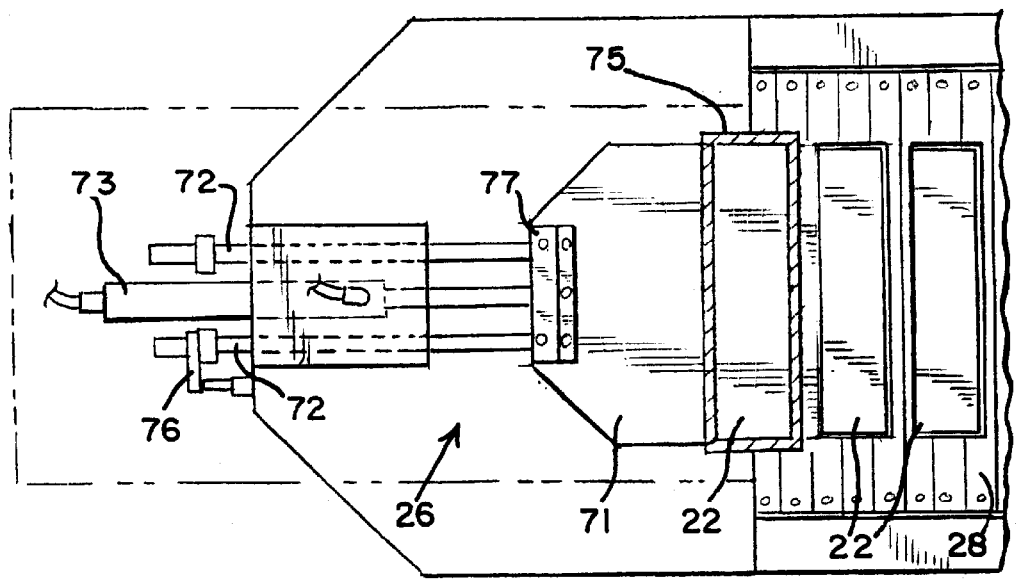

The magazine feeder is set up on a slope or incline, as shown in FIG. 10, with the angle of slope being adjustable. The preferred magazine feeder 26 is shown in detail in FIGS. 15 and 16. Preferably, it uses a Thompson style pusher that uses a push plate 71 with a machined end connected to two 5/8 inch diameter guide shafts 72 and a pneumatic cylinder 73. The gum sheets 22 are placed in a magazine 75. It may be preferable to use a magazine 75 with cutouts in the front and back walls to allow the operator to hold gum with both hands while loading a stack of gum sheets 22 into the magazine 75. Filler may be placed along the side walls of the magazine 75 if the inside dimensions of the magazine 75 are greater than the width and length of the gum sheets 22. The push plate 71 is narrow enough to slide between the sides of the magazine 75. The front and back sides of the magazine are open at the bottom. The push plate 71 is approximately the same thickness as a sheet of gum 22, and initially (FIG. 15) rests against the edge of the bottom sheet. As the cylinder 73 extends, it pushes on the back end of push plate 71, forcing the front edge of push plate against the bottom sheet of gum 22 in magazine 75. This pushes the gum sheet 22 out onto conveyor bed 28 (FIG. 16). The guide shafts 72 help to keep the push plate 71 square to the magazine 75. A stop 76 on the back of one of guide shafts 72 limits the distance of travel of the push plate 71. Thereafter the cylinder 73 retracts, the gum sheets 22 in magazine 75 fall down as the push plate 71 pulls out from under them, and the cycle is ready to be repeated.

The push plate 71 is preferably machined so that it has a flange which connects to the end member 77 attached across the ends of cylinder 73 and guide shafts 72. It has been found that when the push plate had a flange that was made by simply bending up the end of push plate 71, the push plate began to crack at the bend due to the large number and high speed of the repetitions the push plate 71 executes.

Figure 12:
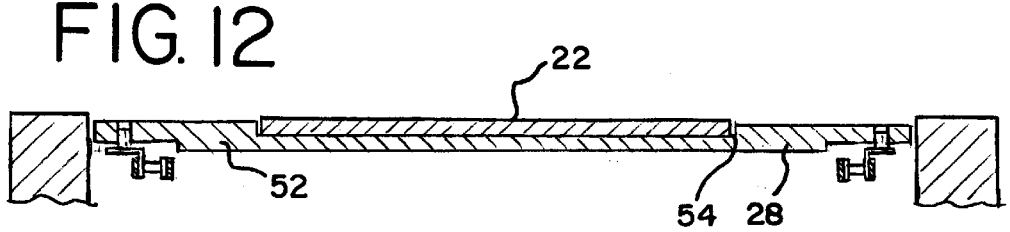
FIG. 12 is a partial cross-sectional view taken along line 12—12 of FIG. 11.
Figure 13:
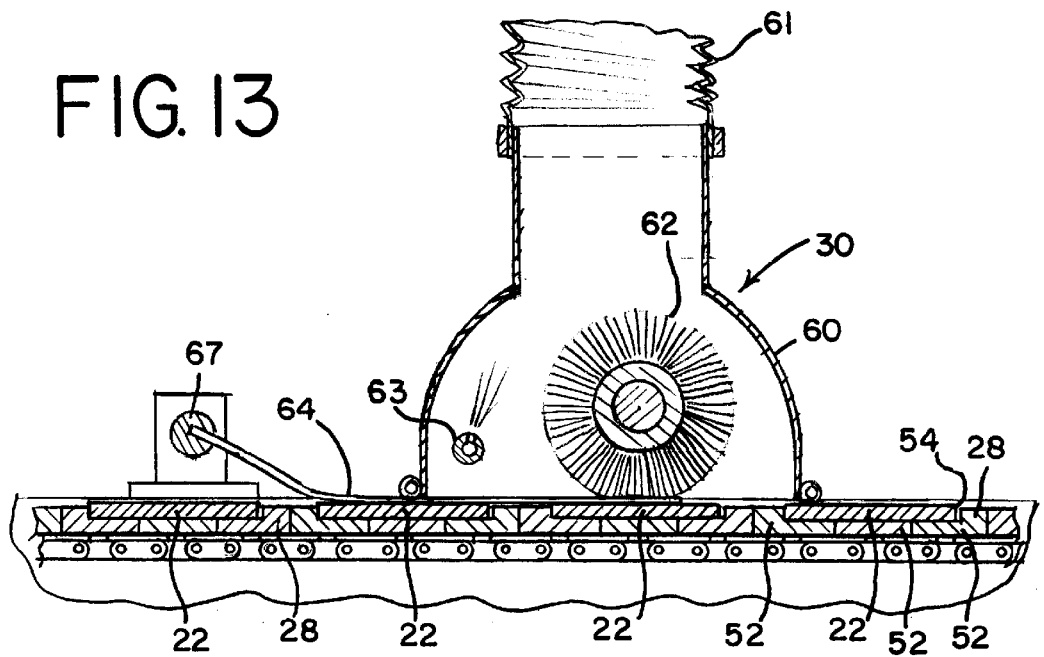
FIG. 13 is a partial cross-sectional view taken along line 13—13 of FIG. 11.
Figure 14:
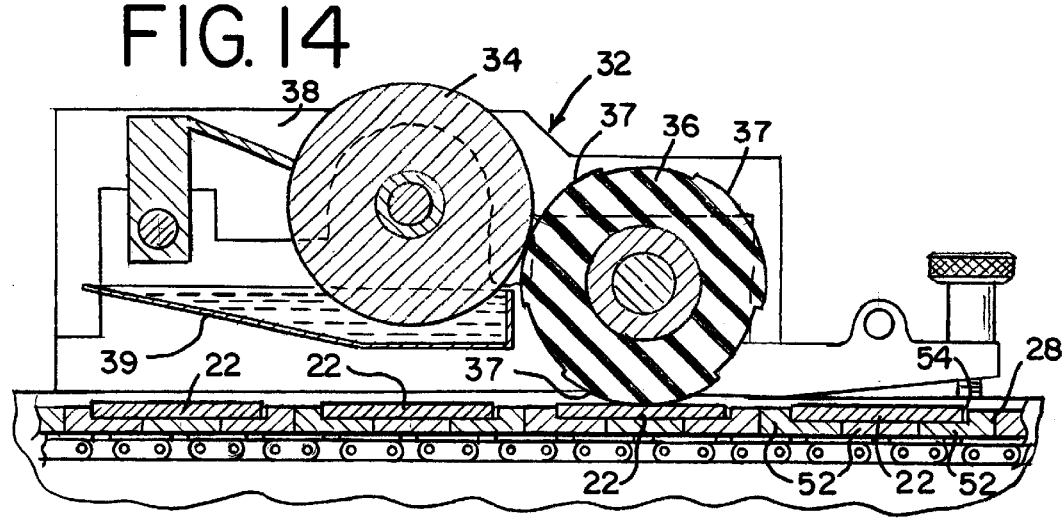
FIG. 14 is a partial cross-sectional view taken along the line 14—14 of FIG. 11.
Figure 15:
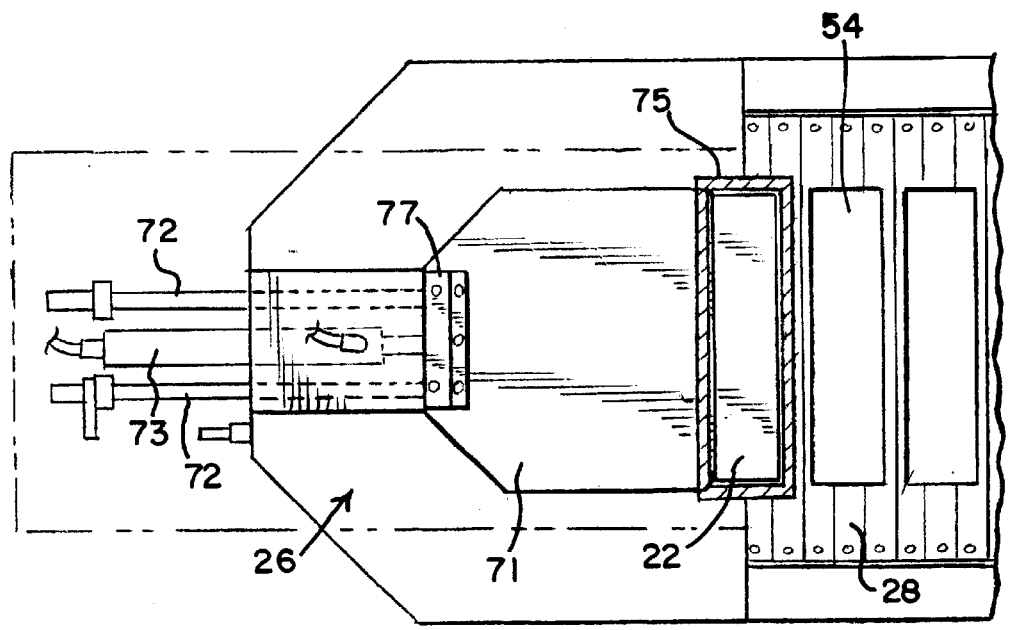
FIGS. 15 and 16 are enlarged top plan views of the feeding section of the apparatus of FIGS. 10 and 11, showing two different operational positions of the equipment.

After being fed into the machine 24, the sheets 22 of chewing gum are moved in a spaced apart fashion by way of a conveyor bed 28 through the printing machine 24. As best seen in FIGS. 12–14, the conveyor bed 28 is made of individual slats 52. Some of these slats have been machined so that the slats 28 provide a plurality of evenly spaced depressions or recesses 54 in the bed 28. The pneumatic cylinder 73 is preferably timed to eject a gum sheet 22 each time one of these recesses 54 come up to the top of the conveyor bed 28. If gum or other confectionery were printed on directly from the sheet forming equipment, it may still be advisable to cut it into sheets and use depressions 54 on the conveyor bed to transfer individual sheets 22 through the equipment. Alternatively, the continuous sheet 20 could be carried by the bed 28 through the printing equipment and the depression 54 would then not be used. These recesses have a width and length slightly larger than the width and length of the sheet of gum 22 to be printed on apparatus 24. The depth of the recesses 54 is preferably the same as the thickness of the sheet of gum 22.

The conveyor bed 28 has a optimum length to promote product handling and permit de-dusting of the sheets 22 of chewing gum necessary for printing. In an embodiment, the conveyor bed 28 is approximately 100 to about 140 inches in length. The conveyor bed 28 is driven by suitable means, such as a drive wheel which engages chain links connected to slats 52. The printing rates are a function of product size, shape, consistency, and lubricity. In an embodiment, the line speed of the conveyor bed 28 is approximately 400 to about 700 inches per minute.

To promote quality printing, the printing machine 24 also includes two de-dusting stations 30a and 30b (referred to generically with reference number 30). The de-dusting stations 30 remove excess dusting compound, such as cornstarch, powdered sugar or other dusting agents, from the sheets 22. The cross section of a preferred de-dusting station 30 is shown in FIG. 13. The de-dusting station 30 preferably includes a chamber cover 60 connected to flexible pipe 61 which in turn is connected to a source of vacuum (not shown), a brush 62, a compressed air pipe 63 and a plurality of hold down fingers 64 secured by a holder 67. The brush 62 is powered by a suitable motor 65 (FIG. 11) which rotates the brush in a direction opposite to the direction of travel of conveyor bed 28. Preferably the brush bearing system uses angular/sealed bearings. Grease fittings are also preferably included in the conveyor bed 28 and other parts of the equipment since it operates in a dust laden atmosphere. Hold down fingers 64 hold the gum sheet 22 into the recess 54 as it passes under the brush 62, thus preventing the brush from picking up the leading edge of sheet 22. The slope on the magazine feeder 26 is adjusted so that the gum is ejected at an angle so that it goes into the recess 54 under the fingers 64.

Compressed air blown through pipe 63 helps direct starch brushed off the gum sheet 22 up the pipe 61 to a dust collection system (not shown). Upon leaving the de-dusting station 30, the gum sheets 22 are against the back edge of the recess 54. Because of this consistent positioning, the sheets 22 are more easily printed on in an accurate fashion down stream of the de-dusting operation.

It is preferred to use two de-dusting stations 30 to remove sufficient starch to leave as clean of a gum surface as possible. Since the hold down fingers 64 block access of the brush 62 to the gum surface directly under the fingers 64, as shown in FIG. 11, the fingers 64a of the first de-dusting station 30a are offset compared to the fingers 64b of the second de-dusting station 30b. In this manner starch not removed in the first de-dusting station because it was covered by hold down fingers 64a is brushed off by the second de-dusting station.

Preferably after leaving the de-dusting stations 30, the gum sheets encounter a guide rail 69 that pushes the gum sheets to the side of the recess 54 so that they are properly aligned for printing. The sheets 22 are next moved along through two printing devices 32, each printing a different color ink onto the gum sheets 22 on the moving conveyor bed 28. Of course, if only one color printing is desired, either a machine 24 with one printing device 32 could be used, or the second device 32 could be moved up out of the way. On the other hand, to allow for the printing of three or more colors, three or more printing devices 32 can be incorporated into the printing machine 24 of the apparatus 10 and the printing registered.

The indicia that is printed onto the chewing gum comprises an edible ink. A variety of such edible inks, in a variety of colors, may be utilized pursuant to the present invention. By way of example, and not limitation, a suitable confectionery ink that may be utilized is Confectionery Ink® CI-10529, Blue available from Colorcon of West Point, Pa. Suitable inks may contain food grade shellac, ethanol, propylene glycol, n-butyl alcohol, titanium dioxide, isopropyl alcohol, lecithin and coloring agent, such as FD&C Red #40 lake or FD&C Blue #2 and #1 lakes.

Any variety of suitable printing device that can effectively print indicia on a sheet of chewing gum can be utilized in the present invention. Preferably, a suitable rotogravure printing device is utilized. Such a device is available from Ackley Machine Corporation, Morristown, N.J. The description of a suitable printing device is set forth in U.S. Pat. No. 4,528,904 entitled: "INK RESERVOIR REMOVING AND INSERTING STRUCTURE FOR ARTICLE MARKING APPARATUS", the disclosure of which is incorporated herein by reference.

As best seen in FIG. 14, the printing devices 32 each include various components and assemblies normally provided in such equipment. For example, the printing device includes a design roller 34 and a rubber roller 36. A doctor blade 38 serves to remove excess ink from the design roller 34.

The quality of the printing on the surface of the confectionery may best be evaluated by comparing it to the quality of printing on a sheet of paper, measured in dots per inch (dpi). The printing on the confectionery product is preferably comparable to a print resolution of at least about 200 dpi, and more preferably comparable to a print resolution of at least about 300 dpi, and most preferably comparable to a print resolution of about 400 dpi or better. In other words, to be considered as having a high resolution of print quality, the printing on the final product should appear comparable in quality to a document printed with a print resolution of at least about 200 dpi.

The quality of the printed indicia on the confectionery will be a function of the quality of the engraving on the design roller 34, as well as other factors, such as how well the confectionery is dedusted, how good of an image transfer there is between the design roller 34 and the rubber roller 36, as well as onto the confectionery itself, and how clean the rollers 34 and 36 are kept of dusting compound. It is preferred to use an engraving on the design roller having a resolution of 400 dpi or better.

In an embodiment, the printing machine 24 includes an electronic doctor blade safety system (not shown) to prevent accidental ink spills caused by one of the following: 1) loss of doctor blade pressure; 2) inadvertent raising of the doctor blade holder while the machine is running; 3) attempting to start the machine with the doctor blade in the "up" position.

To further promote quality printing of indicia on the sheets 22 of chewing gum, the printing device 32 has a lateral adjustment system (not shown). The lateral adjustment system allows the operator of the apparatus 10 to center the printing, from side to side, while the printing machine 24 is running. Similarly, the printing machine 24 includes a circumferential printing register (not shown). This printing register will allow the operator to center the printing, front to back, while the printing machine 24 is running.

In an embodiment, the printing device 32 is a lift up printing device. Such a device is available from Ackley Machine Corporation, Morristown, N.J. The lift up ability offers a multitude of advantages. For example, the use of such a device allows easy removal of an ink pan 39 from the front of the printing machine 24, thereby reducing the possibilities of ink spills. The lift up device allows the operator to lift the entire printing device 32 away from the conveyor bed 28 without losing print registration. In addition, the lift up device facilitates cleaning of the printing device 32, as well as easy removal of the ink pan. The lift up device also eliminates the need for readjusting the rubber roller 36 to the design roller 34 impression after changing the height of the rubber roller 36 compared to the product being printed.

In an embodiment, the printing machine 24 preferably has a variable speed drive system installed to include a totally enclosed, permanent magnet motor for a more reliable system. The printing machine 24 may include an ink recirculation and viscosity control system available from Ackley Machine Corporation to monitor and maintain the proper ink consistency for the best print quality.

The sheets 22 depicted in FIG. 11 are the magic eye puzzle product 180 which are not further cut or divided. However, if the sheets 22 are to be cut into smaller pieces, the conveyor bed 28 moves the sheets 22 through the scoring device 40 (shown in FIG. 10 but left off of FIG. 11 for the sake of clarity). The scoring device 40 engages the sheets 22 of chewing gum as they travel beneath it. When a scoring device is used, the conveyor bed 28 is preferably grooved (not shown) to accept the knife points of the scoring device. In an embodiment, the scoring device 40 cuts the sheets 22 into pieces that are approximately 3 to about 5 inches long and approximately 1.5 to about 2.5 inches wide, resulting in a rectangular shaped product.

The cut up pieces then slide onto an extended conveyor belt 42. The extended conveyor belt 42 ensures that the indicia printed on the chewing gum adequately dries. Preferably a fan blows air on the printed gum pieces to help dry the ink. The extended conveyor belt 42 preferably has a length of approximately 80 to about 120 inches. From there the pieces, such as pieces 116 printed to simulate checks, are inspected, stacked and further packaged.

As an example, the printed check gum 116 is approximately 4¼ inches by about 2 inches. The thickness of the printed check gum 116 is approximately 0.058 to about 0.062 inches.

The recesses 54 are preferably 1/16 inch deep. This depth has been found superior to recesses only 1/32 inch deep. As shown in FIG. 14, the rubber roller 36 has a plurality of raised surfaces 37 which contact the gum and transfers the print image. The raised surfaces are sized and placed, and roller 36 is rotated, so that the raised surfaces match the recesses 54 in the conveyor bed 28. The raised surface is preferably slightly larger than the gum, which is slightly smaller than the recess. For example, the recess 54 may be 4¾ inches long (in the direction of conveyor bed travel), with the gum being 4¼ inches long and the raised areas 4½ circumferential inches long. Preferably the printing is carried out at least 80 impressions per minute and more preferably 120 impressions per minute.

Naturally, as one skilled would contemplate, a variety of different shapes and sizes of printed chewing gum can be made pursuant to the present invention. By way of example, other suitable products could be comic books, puzzles, name placecards and educational facts, to name just a few. The inventors intend that all such additional embodiments fall within the scope of the present invention.

Further improvements may be made to the equipment. For example, starch sometimes fall through spaces between the slats 52 in the conveyor bed 28. A vacuum system inside the apparatus 24 could be used to remove some of that starch. The vacuum would also help hold the gum sheets 22 onto the conveyor bed 28. Also, in the de-dusting stations 30, the amount of air flow taken away by the vacuum system may have to be limited to avoid having he gum sheets 22 picked up by the air flow. If vacuum were applied underneath the bed 28 in the area of the de-dusting stations 30, high air flow rates into the upper vacuum system could be used. Alternatively, a de-dusting operation could be carried out in a separate room or on a separate machine as long as the gum was quickly printed thereafter. While the sheet forming apparatus 12 is conventional and not by itself part of the present invention, it may also be improved to include additional rollers, dusting stations and a metal detector not shown in FIG. 9.

Specific examples of other confectionery items that can be printed on in accordance with the present invention include gummy candy, such as gelatin gummy jellies made as follows:

| | | |
|---|---|---|
| Gelatin (200 Bloom) | 8 | lb. |
| Water | 11.5 | lb. |
| Sorbitol | 2.5 | lb. |
| Sugar | 30 | lb. |
| Corn syrup (42 D.E.) | 40 | lb. |
| Water | 7.5 | lb. |

The gelatin, first amount of water and sorbitol are mixed together, and then the sugar, corn syrup and second amount of water are added. The mixture is warmed to 180° F. in a predissolving tank. Thereafter, the material is continuously processed through a Terbraak static cooker at 260° F. for 20 seconds. A vacuum is drawn in the discharge chamber, continuously cooling the mixture to 140° F. After color and flavor are added, the material is deposited in dry moulding starch at about 77% d.s. and allowed to dry for about 24–48 hours in a 120°–130° F. curing room. Thereafter, the gummy candy is demoulded, dedusted and printed on as described above with respect to the chewing gum.

Another confection that can be printed on is a taffy confection referred to as chewy fruit caramels, made as follows:

| | | |
|---|---|---|
| Sugar | 44 | lb. |
| Water | 14 | lb. |
| Glucose (38 D.E.) | 66 | lb. |
| Fat | 3 | lb. |
| Lecithin | 30 | gr. |
| Dextrin | 8 | lb. |
| Water | 8 | lb. |
| Whipping Agent | 7 | oz. |
| Water | 10 | oz. |
| Glucose (38 D.E.) | 27 | oz. |

The first five ingredients are mixed and brought to a boil. The dextrin and second amount of water are mixed together and then added to the other ingredients. The mixture is boiled while stirring to 246°–248° F. (119°–120° C.) and put on a cooling table. The whipping agent and the third amount of water are mixed, and then mixed with the second amount of glucose. This material is mixed with the warm batch on the cooling table. Color and flavor are added, and the material is pulled for approximately five minutes and passed through a sheet forming machine. Thereafter, it is printed on as discussed above.

A dehydrated fruit based confectionery such as a sweetened dehydrated fruit leather derived from fruit purees could also be printed on as described above.

It should be understood that various changes and modifications to the presently preferred embodiments described herein can be made without departing from the spirit and scope of the present invention and without diminishing its attendant advantages. It is therefore intended that such changes and modifications be covered by the appended claims.

We claim:

1. A method of printing multiple color indicia on confectionery products comprising:
   a) providing a continuous sheet of confectionery product;
   b) cutting the continuous sheet of confectionery product into a plurality of separately divided discrete sheets of confectionery product;
   c) cooling the sheets to a temperature and for a time sufficient to temper and harden the sheets;
   d) successively retaining the sheets on a conveyor bed in a fixed position relative to the conveyor;
   e) advancing the conveyor bed to bring the sheets to a first printing position in registration with a first printing device at which a first color, corresponding to a first portion of the multiple color indicia, is printed on the sheets of confectionery product;
   f) further advancing the conveyor bed to bring the sheets to a second printing position in registration with a second printing device at which a second color, different from said first color and corresponding to a second portion of the multiple color indicia, is printed on the sheets of confectionery product; and
   g) removing the multiple colored printed confectionery sheets from the conveyor bed.

2. The method of claim 1 wherein the sheets have a thickness of approximately 0.054 inches to about 1 inch.

3. The method of claim 2 further comprising the step of dividing each discrete sheet into pieces of confectionery product after printing.

4. The method of claim 1 wherein the step of providing a continuous sheet and cutting into discrete sheets is performed on a different machine than that used to perform the printing step.

5. The method of claim 4 further comprising the step of dividing each discrete sheet into pieces of confectionery product after printing.

6. The method of claim 1 wherein the step of cooling the sheets includes storing the sheets for approximately 12 hours to about 36 hours prior to printing.

7. The method of claim 6 further comprising the step of dividing each discrete sheet into pieces of confectionery product after printing.

8. The method of claim 6 further comprising the step of removing excess dusting compound from the sheets prior to printing indicia on the sheets of confectionery product.

9. The method of claim 1 further comprising the step of removing excess dusting compound from the sheets prior to printing indicia on the sheets of confectionery product.

10. The method of claim 9 wherein a rotating brush is used to remove excess dusting compound.

11. The method of claim 10 wherein a plurality of hold down fingers hold some of the sheets of confectionery product on the conveyor bed while the sheets are being contacted by the rotating brush.

12. The method of claim 9 further comprising the step of dividing each discrete sheet into pieces of confectionery product after printing.

13. The method of claim 1 wherein at least three colors of edible ink are printed on the sheets of confectionery product.

14. The method of claim 13 further comprising the step of dividing each discrete sheet into pieces of confectionery product after printing.

15. The method of claim 1 further comprising the step of dividing each discrete sheet into pieces of confectionery product after printing.

16. The method of claim 15 wherein the pieces comprise generally flat pieces of chewing gum formed by scoring a thin, flat sheet having a thickness of between about 0.054 inches and about 1 inch, the gum pieces having a rectangular shape with a length of between about 3 and about 5 inches and a width of between about 1.5 and about 2.5 inches.

17. The method of claim 1 wherein the confectionery product is selected from the group consisting of chewing gum, taffy, gummy candy and dehydrated fruit based confections.

18. The method of claim 1 wherein the confectionery product comprises chewing gum.

19. The method of claim 1 wherein the sheets, when printed on, are generally rectangular, flat sheets of chewing gum having:
   a) a thickness of between about 0.054 and about 1 inches;
   b) a width of between about 5 and about 20 inches; and
   c) a length of between about 1 and about 17 inches.

20. The method of claim 19 further comprising the step of dividing each discrete sheet into pieces of confectionery product after printing.

21. The method of claim 19 further comprising the step of removing excess dusting compound from the sheets prior to printing indicia on the sheets of confectionery product.

22. The method of claim 1 wherein the indicia is in the form of printing on a check.

23. The method of claim 1 wherein the indicia is in the form of printing on a traffic citation.

24. The method of claim 1 wherein the indicia is in the form of printing on a magic eye puzzle.

25. The method of claim 1 wherein the indicia is in the form of printing on a sports trading card.

26. The method of claim 1 wherein the confectionery sheets are printed with multiple printed indicia thereon and are each divisible into smaller pieces of confectionery, each with an individual, complete printed indicia thereon.

27. The method of claim 26 further comprising the step of dividing each discrete sheet into pieces of confectionery product after printing.

28. The method of claim 26 further comprising the step of removing excess dusting compound from the sheets prior to printing indicia on the sheets of confectionery product.

29. The method of claim 1 wherein the printing is done by a rotogravure process.

30. The method of claim 29 further comprising the step of dividing each discrete sheet into pieces of confectionery product after printing.

31. The method of claim 29 further comprising the step of removing excess dusting compound from the sheets prior to printing indicia on the sheets of confectionery product.

32. The method of claim 1 wherein the printed indicia has a high degree of resolution.

33. The method of claim 32 further comprising the step of dividing each discrete sheet into pieces of confectionery product after printing.

34. The method of claim 1 wherein the confectionery comprises chewing gum and is cooled to a temperature of approximately 51° F. to 56° F. prior to printing.

35. The method of claim 1 wherein the conveyor bed includes recesses and the confectionery product sheets are carried in said fixed position by the recesses while the sheets are printed to provide accurate registration of two or more successive prints on the confectionery product sheets.

36. The method of claim 1 wherein the individual sheets are fed onto the conveyor bed from a magazine feeder.

37. The method of claim 36 wherein the magazine feeder is positioned at an incline relative to the conveyor bed.

38. The method of claim 1 wherein the step of cooling the sheets includes cooling the sheets to a temperature of between about 48 and about 70° F.

39. The method of claim 38 further comprising the step of dividing each discrete sheet into pieces of confectionery product after printing.

40. The method of claim 1 wherein the step of cooling the sheets includes cooling the sheets to a temperature of below approximately 56° F.

41. The method of claim 40 further comprising the step of dividing each discrete sheet into pieces of confectionery product after printing.

42. A method of printing multiple color indicia on chewing gum comprising:
   a) forming a mass of chewing gum into a continuous sheet;
   b) cutting the continuous sheet into a plurality of separately divided discrete sheets of chewing gum having a thickness of approximately 0.054 inches to about 1 inch;
   c) cooling the sheets of chewing gum to a temperature and for a time sufficient to temper and harden the sheets;
   d) feeding the sheets of chewing gum from a magazine feeder onto a moving conveyor bed, the conveyor bed including recesses;
   e) removing excess dusting compound from the sheets of chewing gum on the conveyor bed using a rotating brush while a plurality of hold down fingers hold the sheets in the recesses on the conveyor bed;
   f) advancing the conveyor bed to bring the sheets to a first printing position in registration with a first printing device at which a first color, corresponding to a first portion of the multiple color indicia, is printed on the sheets of chewing gum by a rotogravure process;
   g) further advancing the conveyor bed to bring the sheets to a second printing position in registration with a second printing device at which a second color, different from said first color and corresponding to a second portion of the multiple color indicia, is printed on the sheets of chewing gum by a rotogravure process; and
   h) removing the multiple colored printed chewing gum sheets from the conveyor bed.

43. The method of claim 42 wherein the method comprises passing the sheets of chewing gum through two de-dusting stations.

44. The method of claim 43 further comprising the step of dividing each discrete sheet into pieces of chewing gum after printing.

45. The method of claim 42 wherein the de-dusting is performed by a brush which rotates opposite the direction of travel of the chewing gum sheets.

46. The method of claim 42 wherein the recesses have a depth of about 1/16 inch.

47. The method of claim 42 wherein the step of cooling the sheets includes cooling the sheets to a temperature of between about 48 and about 70° F.

48. The method of claim 47 further comprising the step of dividing each discrete sheet into pieces of chewing gum after printing.

49. The method of claim 42 wherein the step of cooling the sheets includes cooling the sheets to a temperature of below approximately 56° F.

50. The method of claim 49 further comprising the step of dividing each discrete sheet into pieces of chewing gum after printing.

51. The method of claim 42 further comprising the step of dividing each discrete sheet into pieces of chewing gum after printing.

52. A method of printing multiple color indicia on chewing gum comprising:
   a) forming a mass of chewing gum into a continuous sheet;
   b) cutting the continuous sheet into a plurality of separately divided discrete sheets of chewing gum having a thickness of approximately 0.054 inches to about 1 inch;
   c) cooling the sheets of chewing gum to a temperature below approximately 56° F. for a time sufficient to temper and harden the sheets;
   d) feeding the sheets of chewing gum from a magazine feeder onto a moving conveyor bed, the magazine feeder being sloped compared to the conveyor bed and the conveyor bed including recesses having a depth of about 1/16 inch;
   e) removing excess dusting compound from the sheets of chewing gum on the conveyor bed using a rotating brush while a plurality of hold down fingers hold the sheets in the recesses on the conveyor bed;
   f) advancing the conveyor bed to bring the sheets to a first printing position in registration with a first printing device at which a first color, corresponding to a first portion of the multiple color indicia, is printed on the sheets of chewing gum by a rotogravure process;
   g) further advancing the conveyor bed to bring the sheets to a second printing position in registration with a second printing device at which a second color, different from said first color and corresponding to a second portion of the multiple color indicia, is printed on the sheets of chewing gum by a rotogravure process; and
   h) removing the multiple colored printed chewing gum sheets from the conveyor bed.

53. The method of claim 52 further comprising the step of dividing each discrete sheet into pieces of chewing gum after printing.

* * * * *